United States Patent
Oertel

(10) Patent No.: US 9,137,031 B2
(45) Date of Patent: Sep. 15, 2015

(54) METHOD AND TRANSMITTER FOR PRODUCING A DATA STREAM, METHOD AND RECEIVER FOR CALLING AT LEAST ONE DATA SEGMENT IN A DATA STREAM

(75) Inventor: Norbert Oertel, Landshut (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 1221 days.

(21) Appl. No.: 12/448,416

(22) PCT Filed: Oct. 15, 2007

(86) PCT No.: PCT/EP2007/060940
§ 371 (c)(1),
(2), (4) Date: Jun. 19, 2009

(87) PCT Pub. No.: WO2008/074535
PCT Pub. Date: Jun. 26, 2008

(65) Prior Publication Data
US 2010/0030861 A1    Feb. 4, 2010

(30) Foreign Application Priority Data
Dec. 19, 2006  (DE) .................. 10 2006 060 043

(51) Int. Cl.
*G06F 15/16*     (2006.01)
*H04L 12/18*     (2006.01)
(Continued)

(52) U.S. Cl.
CPC .......... *H04L 12/1854* (2013.01); *H04N 21/21* (2013.01); *H04N 21/23* (2013.01); *H04N 21/8455* (2013.01); *H04N 21/8456* (2013.01)

(58) Field of Classification Search
CPC ............... H04L 12/1854; H04N 21/21; H04N 21/8456; H04N 21/8455; H04N 21/23
USPC .......................................................... 709/206
See application file for complete search history.

(56) References Cited

U.S. PATENT DOCUMENTS 7,613,182 B2* 11/2009 Lecomte et al. ............... 370/389
2002/0013948 A1* 1/2002 Aguayo et al. ................. 725/91
(Continued)

FOREIGN PATENT DOCUMENTS

WO    WO 02073441 A1    9/2002

OTHER PUBLICATIONS

M. Castro, P. Druschel, A. Kermarrec, A. Nandi, A. Rowstron, A. Singh; SplitStream: High-Bandwidth Multicast in Cooperative Enviroments; M. Castro et al.: "SplitStream: High-Bandwidth Multicast in Cooperative Enviroments", SOSP 2003, Oct. 19-22, 2003, Bolton Landing, New York Copyright 2003 ACM 1-58113-757-5/03/0010; Bolton Landing, New York; SOSP; Others; 2003; US.

(Continued)

*Primary Examiner* — Jonathan Bui
(74) *Attorney, Agent, or Firm* — Staas & Halsey LLP

(57) ABSTRACT

A method produces a data stream. The data stream is subdivided into at least one data segment. A key which is associated unambiguously with that data segment is created. A node is selected from a set of nodes in a network for that data segment on the basis of the key associated with that data segment, and the data segment is transmitted to the node selected for that data segment. Furthermore, a method calls at least one data segment in a data stream by a receiver node. A key which is associated unambiguously with that data segment is produced. A node is selected from a set of nodes in the network for the data segment on the basis of the key associated with that data segment. A request message is sent to the selected node to transmit the data segment associated with the key, and the data segment is received by the receiver.

19 Claims, 2 Drawing Sheets

(51) Int. Cl.
*H04N 21/21* (2011.01)
*H04N 21/23* (2011.01)
*H04N 21/845* (2011.01)

(56) References Cited

U.S. PATENT DOCUMENTS

| | | | | |
|---|---|---|---|---|
| 2004/0192342 | A1* | 9/2004 | Ranganathan | 455/456.1 |
| 2005/0015431 | A1 | 1/2005 | Cherkasova | |
| 2006/0187860 | A1 | 8/2006 | Li | |
| 2006/0294561 | A1* | 12/2006 | Grannan et al. | 725/101 |
| 2007/0101104 | A1* | 5/2007 | Diefendorff | 712/225 |
| 2008/0130890 | A1* | 6/2008 | Rigler | 380/259 |
| 2009/0132823 | A1* | 5/2009 | Grimen et al. | 713/171 |
| 2010/0017532 | A1* | 1/2010 | Bowen | 709/231 |

OTHER PUBLICATIONS

Randerath D. et al., Streaming-Software: ein Vergleich, Publisher, Ausgabe Feb. 2002, im Internet: http://www.publisher.ch/heft/022/streamingmedia.pdf; Randerath D. et al., Streaming-Software: ein Vergleich, Publisher, Ausgabe Feb. 2002, im Internet: http://www.publisher.ch/heft/022/streamingmedia.pdf; Randerath D. et al., Streaming-Software: ein Vergleich, Publisher, Ausgabe Feb. 2002, im Internet: http://www.publisher.ch/heft/022/streamingmedia.pdf; Others.

Spainhour, S et al., Webmaster in a nutshell, O'Reilly, Jun. 1999, pp. 379-383; Spainhour, S et al., Webmaster in a nutshell, O'Reilly, Jun. 1999, pp. 379-383; Spainhour, S et al., Webmaster in a nutshell, O'Reilly, Jun. 1999, pp. 379-383; Others.

Rowstron A et al: "Storage management and caching in PAST, a large-scale, persistent peer-to-peer storage utility" Operating Systems Review, ACM Press, XX, Bd. 35, Nr. 5, Oct. 21, 2001, Seiten 188-201, XP002302659 ISSN: 0163-5980 Zusammenfassung; Others; 2001.

Castro M et al: "Splitstream: High-bandwidth content distribution in cooperative enviroments" ACM SOSP. Proceedings of the ACM Symposium on Operating Systems Principles, ACM,, US, Oct. 19, 2003, Seiten 298-313, XP002348345 Punkte 1, 2, 3, 4 ; Others; 2003.

Yiu, Ken, "Supporting Interactive Media-on-Demand Service in Peer-to-Peer Network", Department of Computer Science, HKUST, Nov. 24, 2005.

Office action issued by the European Patent Office on Aug. 21, 2012 in the corresponding European patent application.

* cited by examiner

METHOD AND TRANSMITTER FOR PRODUCING A DATA STREAM, METHOD AND RECEIVER FOR CALLING AT LEAST ONE DATA SEGMENT IN A DATA STREAM

CROSS REFERENCE TO RELATED APPLICATIONS

This application is based on and hereby claims priority to PCT Application No. PCT/EP2007/060940 filed on Oct. 15, 2007 and German Application No. 10 2006 060 043.6 filed on Dec. 19, 2006, the contents of which are hereby incorporated by reference.

BACKGROUND OF THE INVENTION

The invention relates to a method and a transmitter for providing a data stream and to a method and a receiver for retrieving at least one data segment of a data stream.

For distributing large volumes of data within a broadcasting context as in of case of, for instance, IP-TV (IP—Internet Protocol), the following two systems are currently known:

Broadcasting is in the case of a first system effected with the aid of a central infrastructure. A data stream requiring to be distributed is therein transmitted by a broadcaster to a multimedia server that has a network link to one or more users and is responsible for distributing the data stream to said users. Distributing is provided by, for example, point-to-point connections. If there are a large number of users it is possible to employ a hierarchy of multimedia servers that reduce a load for distributing one multimedia server's data stream. Core-network loading can furthermore be reduced by employing a plurality of multimedia servers because each multimedia server will exclusively serve one network segment. That system, however, requires a central infrastructure that controls distributing of the data stream to the multimedia server(s).

A second system employs overlay structures having distribution trees that manage without a central infrastructure. What are known are, for example, methods for relaying over P2P networks (P2P—peer-to-peer) such as, for instance, a PeerCast technology. Novel approaches to said second system split the data stream into partial streams that are then distributed over overlay structures such as in the case of, for instance, the known splitstream method [1] M. Castro et al, "Splitstream: High-Bandwidth Multicast in Cooperative Environments", SOSP 2003, Oct. 19-22, 2003, Bolton Landing, N.Y., USA. The result is that all nodes can be internal nodes in one of the distribution trees and will hence contribute bandwidth for distributing the data stream. What, though, is disadvantageous about said methods is that substantial effort is needed to maintain the distribution trees. So any such method will be highly complex and very prone to faults owing to decentralized administering of the tree structures.

SUMMARY

It is hence one possible object to provide a method and device by which the distribution and retrieval of a data stream within a broadcasting context will be provided in a simple and secure manner.

The inventor proposes a method for providing a data stream, by which method the data stream is divided into at least one data segment, a key is created that is unambiguously assignable to the data segment, a node for the data segment is selected from a set of nodes in a network on the basis of the key assigned to the data segment, and the data segment is conveyed to the node selected for the data segment.

The present method enables simple distributing in the network of the data stream having at least one data segment through simple linking of the data segment to the node that makes the respective data segment available for retrieval by a user, meaning a receiver. A load associated with retrieving the data segments from a single broadcast server will therein be reduced because the receivers retrieve the data segments not from a broadcast server but from the node(s). Distributing of the data segments will, moreover, be more secure against attackers because the receiver has to know which specific node in the set of nodes in the network has the required data segment. The key has to be created for determining said node, with the key being derived from the data segment.

The inventor also proposes a method for the retrieval of at least one data segment of a data stream by a receiver, with the data segment of the data stream being made available by a node in a network, by which method a key is provided that is unambiguously assignable to the data segment, a node for the data segment is selected from a set of nodes in a network on the basis of the key assigned to the data segment, a request message is sent to the selected node for conveying the data segment associated with the key, and the data segment is received by the receiver.

The method for retrieving insures that the data segment made available on the node can be retrieved by the receiver node in a simple and secure manner.

Both cited methods will enable security to be enhanced when two or more data segments are used because the data segments can be stored on a multiplicity of different nodes and an attacker not only has to know which nodes have to be interrogated for receiving the data segments but will also have to conform to a specific request sequence to be able thereby to reconstruct a valid data stream from the data segments received. More secure means that the attacker will have to expend not inconsiderable effort, for example compute effort, to access the data segment(s), with an attack on the part of the attacker referring to retrieving and/or manipulating the data segments.

In a preferred development of the method for retrieving, the request message includes at least one identifier identifying an unambiguous assignment of the request message to the requested data segment. The request message includes in particular the key that unambiguously identifies the data segment. The expansion has the advantage that unambiguous requesting of the data segment from the selected node will be insured even if the node is holding ready more than one data segment of the data stream. That will be of interest particularly when there are only few nodes in the network.

The receiver node is preferably supplied with synchronizing information with the aid of which the key providing retrieval of a further data segment of the data stream is determined. The further data segment therein corresponds to the data segment required for retrieving the data stream beginning with the further data segment. That will be advantageous for the specific application where, for instance, the receiver wishes to start the data stream from any position. In the case particularly of a broadcast in realtime, for example a football match, the further data segment will indicate the current entry point of the data-stream transmission.

The synchronizing information can therein be supplied by an explicit indication of the key or at least of a first predictable parameter of the further data segment. Indicating the key will make it easy to ascertain the node containing the further data segment. The at least one first predictable parameter will enable the receiver to ascertain the key with whose aid the node containing the further data segment can be identified.

The data segment will while being conveyed on a transmission path from the node to the receiver preferably be stored for a specifiable period of time by at least one intermediate node situated on said transmission path. The request message can, in an expansion, furthermore be evaluated by the intermediate node and, if the data segment associated with the key is present, the data segment can be sent to the receiver. Said evaluating is based on, for example, an address of the node. The expansions each have the advantage that if a receiver repeats a retrieval request it will be possible for the requested data segment to be delivered to the requesting receiver by the intermediate node itself. That will on the one hand reduce the response time for the receiver's receiving the data segment as it will not be necessary to traverse the entire transmission path up to the selected node. On the other hand there will be a saving in network load for transmitting the data packet because it will not have to traverse the entire transmission path but be transported only on the section of the transmission path from the intermediate node to the receiver node. Overflowing of an internal memory in the intermediate node will be obviated by specifying the specifiable period of time because the data segment will be deleted after that period, for example 10 minutes.

Different receivers' request messages for retrieving the same data segment are in an optional development dispatched based on a specifiable or randomly ascertained time delay. The respective request messages will as a result be dispatched at different instants so that the intermediate node will already have the requested data segment to hand if the request message is sent again, because the requested data segment will have been stored in the intermediate node owing to the request message's having been sent the first time. What is achieved by that expansion is that the request messages will be dispatched at different instants, as a result of which the intermediate node will have the requested data segment to hand on receipt of the second and further request messages and be able to deliver the desired data segment to the receiver without forwarding the request message to the node. A reduction in transmission bandwidth in parts of the data network can be achieved thereby.

The key is produced preferably by a systematic key, with the systematic key being generated on the basis of at least one second predictable parameter of the data segment. The systematic key will be simple to generate, with key generating already being enabled when the second predictable parameter is known. The predictable parameter can be, say, an item of information belonging to an encoding scheme such as, for instance, an item of syntactic information, with said information having traversed the data segment such as, for example, an image number for the data segment that includes a compressed image in keeping with an image-encoding method.

The key is in an alternative development generated by a non-systematic key, with the non-systematic key being generated on the basis of a content of the data segment, in particular an image content. The content of the data segment is therein used for producing the key. The key is generated using, for example, a hash-key technique such as the MD5 technique (MD5—Message Digest Algorithm 5). Since a person skilled in the relevant art will be familiar with further methods by which a key can be generated from the content of the data segment, this will not be dealt with in more detail.

The first and/or second predictable parameter are/is in a preferred development determined by a number characterizing the data segment. The characterizing number can therein be an image number, a packet number, a number of already transmitted data segments of the data stream, or a time of day at which the data segment is to be fed out in the form of a number such as, for example, the time of day expressed in seconds. That list of variants for forming an unambiguous, characteristic number for one of the data segments should not be understood as a limitation. Since a person skilled in the relevant art will be familiar with further variants, this will not be dealt with in more detail.

The first and/or second predictable parameter can furthermore additionally include an indication of a processing speed of data segments per unit of time, with the key that is valid at an instant for retrieving the data segment valid at said instant being produced with the aid of the processing speed. After receipt of the first or second predictable parameter and the processing speed, the receiver can thereby ascertain the key that is valid at a later instant without the need to retransmit the first or second predictable parameter that is valid at a later instant. Transmission bandwidth will be saved and the method's flexibility increased thereby.

The node is selected based on the key preferably such that an identity between, on the one hand, a parameter characterizing the node and, on the other, the key will be maximized or at least one specifiable threshold attained. The method will thereby enable the node to be recognized even if errors occur while the key is being produced and/or transmitted. A method for ascertaining the node can furthermore be terminated prematurely once determining of the node has achieved an accuracy indicated by the specifiable threshold. The methods can also be employed for two or more data segments.

The inventor also proposes a transmitter and a receiver to implement the methods mentioned above.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
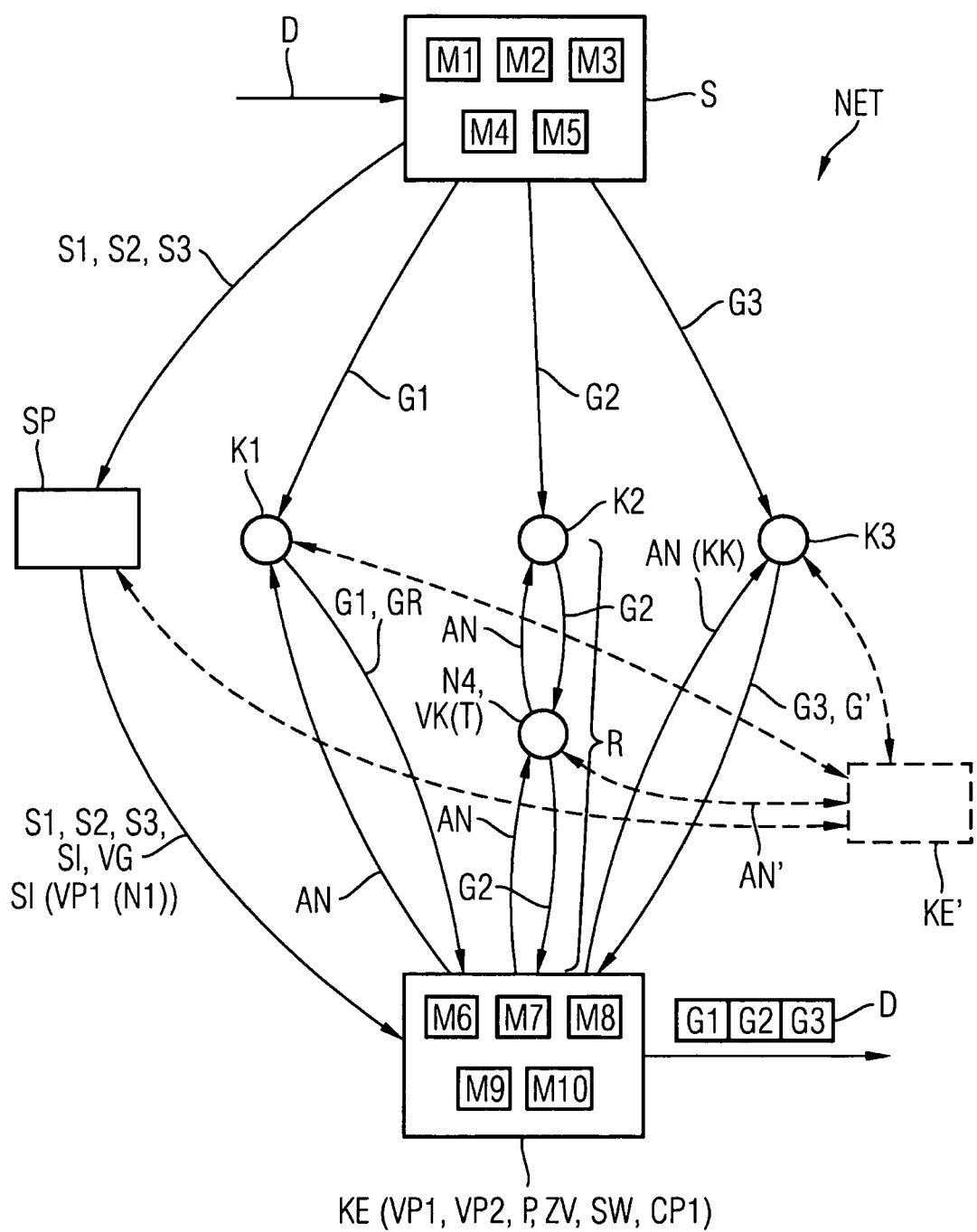
FIG. 1 shows a data network having a plurality of nodes, a transmitter, and two receivers, as well as a memory unit and an intermediate node for implementing the methods for providing a data stream and for retrieving at least one data segment.

Reference will now be made in detail to the preferred embodiments of the present invention, examples of which are illustrated in the accompanying drawings, wherein like reference numerals refer to like elements throughout.

To be seen in FIG. 1 are a transmitter S, a receiver E, a plurality of nodes N1, . . . , N4, and a memory unit SP that are interconnected within a network NET, for example an IP-based network (IP—Internet Protocol), for exchanging data and/or information. The transmitter, for example a TV broadcaster, wishes to make a data stream D, for example current news, available for at least one receiver. The transmitter S for that purpose divides the data stream into data segments G1, G2, G3. Said dividing can be performed based on content, meaning that each data segment will correspond to a part of the news within the current news. Dividing can alternatively be carried out based on a physical property of the data stream such as, for example, image-by-image.

In an ensuing step the transmitter unambiguously assigns a respective data segment a key S1, S2, S3. The keys have the property of each being unambiguously assignable only to one of the data segments. A specific procedure for producing said keys will be dealt with later.

The data segments are in a further step each distributed to one of the nodes K1, ..., K3. For the data segment G1 the specific node K1 is therein selected that can be unambiguously assigned from the set M of nodes K1, K2, K3, K4 with the aid of the key S1 associated with the data segment G1. Thus the key S1 is characterized by a binary pattern having 16 places. Each node K1, ..., K3 is furthermore assigned a characteristic identification parameter CP1, CP2, CP3. The respective characterizing identification parameter CP1, CP2, CP3 characterizes its node in an unambiguous manner, for example by a respective 16-bit binary pattern.

Determining the node K1 that matches the key S1 is achieved by selecting for the specified key S1 the specific node K1, K2, K3 whose characteristic identification parameter CP1, CP2, CP3 minimizes a distance between the respective identification parameter and the key, which is to say maximizes an identity between the identification parameter and the key. That will be explained in more detail with the aid of the following example.

S1=0000 1110 0000 1110
cP1=0000 1011 0001 1100
CP2=1110 1111 1101 0000
CP3=0110 0000 0000 1111

If a number A is ascertained at identical binary places, then the number of respective characterizing parameters CP1, ..., CP3 with respect to the key S1 will be as follows:

$$A(CP1)=12, A(CP2)=6, A(CP3)=10.$$

The characterizing parameter CP1 thus exhibits the least distance, meaning the greatest identity to the key S1, as a result of which the node K1 will have been unambiguously identified.

Identity can be based on a threshold SW instead of on maximizing. The identity between the key and the characteristic parameter of the respective node will therein be recognized if the identity at least attains the threshold. In the above numeric example of the identity the threshold SW is 11.

The node K1 will thus be selected because the identity between it or, as the case may be, its characterizing parameter and the key at least attains the threshold because $A(CP1) \geq SW$.

When the key S1 has been unambiguously assigned to a respective node K1, ..., K3, the transmitter will transmit the respective data segment to the node assigned using the key. In FIG. 1 the data segment G1 is conveyed to the node K1, the data segment G2 to the node K2, and the data segment G3 to the node K3. The keys S1, S2, S3 are furthermore dispatched by the transmitter to the memory unit SP and stored there.

For retrieval of at least one of the data segments of the data stream by the receiver KE, the receiver KE first requests the keys 51, ..., 53 from the memory unit. Each key is then unambiguously assigned one of the nodes K1, ..., K3 analogously to what was explained for the transmitter. For retrieving the data segment the receiver sends a request message AN to the node K1, which transmits the data segment G1 to the receiver. The receiver then sends a further request message AN to the node K2, with said request message reaching first, on a transmission path R between the receiver KE and the node K2, the node K4, which is to say an intermediate node VK, which forwards the request message to the node K2. The node K2 responds upon receipt of the request message by sending the data segment G2, with said data segment first being received by the node K4 then forwarded by it to the receiver E. The receiver finally sends a further request message AN to the node K3, with the node K3 conveying the data segment G3 to the receiver upon receipt of said further request message. The receiver assembles the received data segments G1, ..., G3, as a result of which the data stream D will be produced.

In the exemplary embodiment according to FIG. 1 both a key has been unambiguously assigned to a node and a node unambiguously assigned to a key. It is in general also possible for a plurality of keys to be assigned to a node. In that case the request message will include an identifier KK such as, for example, the key, so that the node receiving the request message will be able to unambiguously identify the desired data segment and send it to the receiver.

A further receiver KE' wishes, in an expansion, to retrieve the data segments G1, ..., G3. The communication relationships arising therein are represented by dashed-line arrows. The further receiver first calls up the keys S1 to S3 from the memory unit SP. Analogously to the procedure for the receiver KE, the nodes K1, ..., K3 are then requested with the aid of respective request messages AN to convey the respective data segments G1, ..., G3 to the further receiver. An expansion of the method described for the receiver KE emerges from the further receiver's request to the node K2 for acquiring the data segment G2.

When the data segment G2 is being delivered to the receiver KE, the node K2 first sends the data segment G2 to the node K4, meaning to the intermediate node VKJ, and that forwards the data segment G2 to the receiver KE. On that transmission path R the data segment G2 is, in the expansion, buffered for a specifiable period of time T, for example T=1 hour, in the node K4 before being delivered from there to the receiver E. The node K4 represents on the transmission path R the intermediate node VK. When the data segment G2 has been retrieved by the receiver KE, the further receiver KE' retrieves the same data segment G2 from the node K2. Its further request message AN' is for that purpose first delivered to the intermediate node VK. The intermediate node VK evaluates the further request message and recognizes that it has buffered the requested data segment G2. The intermediate node VK thereupon conveys the requested data segment G2 to the further receiver. Forwarding of the further request message to the node K2 and conveying of the data segment G2 by the node K2 from or, as the case may be, to the node K4 is dispensed with in that expansion because the requested data segment is already present within the transmission path R.

Figure 2A:
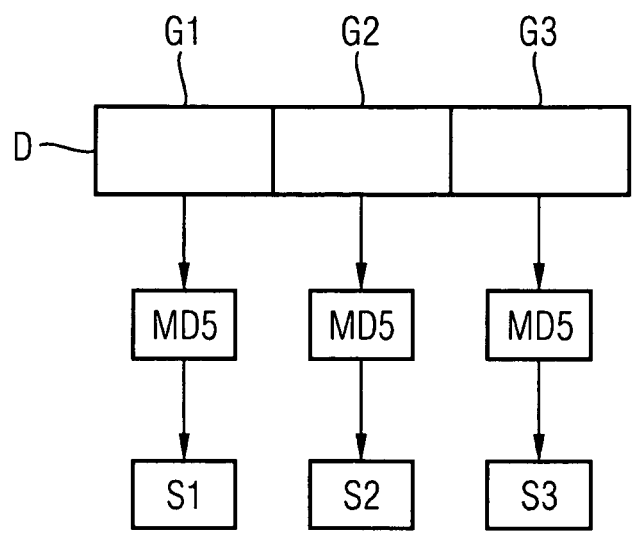
FIGS. 2A, 2B show procedures for creating a key for the data segment.

A systematic or non-systematic key can be generated for determining the key. As illustrated in FIG. 2a, in the non-systematic case the key is generated from the respective data segment's content using a technique, for example the MD5 technique (MD5—Message Digest Algorithm 5) to produce a hash value having, for instance, a 128-bit hash value. If the data segment G1 is an image, then the key will be created from the image's content, which is to say S1=MD5 (G1).

Figure 2B:
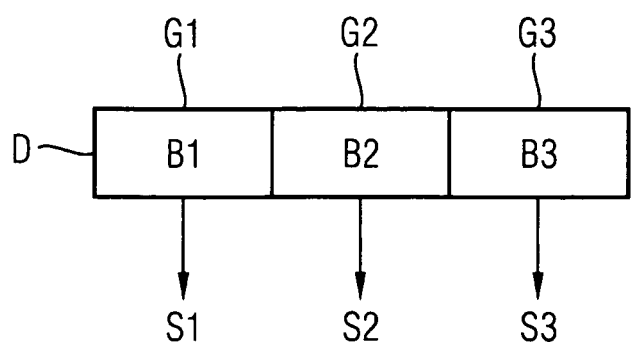

In the systematic case the key is generated by taking a further predictable parameter VP2 of the data segment G1 into account. That will be explained in more detail with the aid of FIG. 2b. The data stream D includes therein of three images B1, B2, B3, with the first image B1 having an image number 1, the second image an image number 2, and the third image an image number 3. Each image has in that example been assigned to a respective data segment, which is to say that G1=B1, G2=B2, G3=B3. For creating the key S1 for the data segment G1, the key is created on the basis of the image number assigned to the data segment, for example S1=1. The procedure is analogous for the further keys S2, S3 so that S2=2 and S3=3.

Since a person skilled in the relevant art will be familiar with a multiplicity of methods beyond those presented here for creating the non-systematic and systematic key, this will not be dealt with in more detail.

If the data stream D describes a realtime data stream, for example a television broadcast of a football match, then it will in practice not be expedient for the receiver to request all data segments from when the data stream started being broadcast for enabling entry into the football match's current state of play. The receiver is for that purpose supplied with synchronizing information S1, with its being possible with the aid of the synchronizing information to ascertain which specific key will secure the retrieval of a further data segment G'. The synchronizing information S1 can be realized by indicating the key to be used for the further data segment or by indicating at least one first predictable parameter VP1. In the first instance the receiver is explicitly informed of the key on the basis of which the receiver is to retrieve the currently valid data segment. In the second instance it is possible with the aid of the first predictable parameter VP1 to obtain information about a synchronizing point within the data stream with the aid of which a key associated with the synchronizing point can be ascertained and hence the associated data segment retrieved. For example a current image number is transmitted as the first predictable parameter VP1. If the current image number is, for example, 8596, then VP1=8596. The receiver will with the aid of that information be able to generate the appropriate key, such as S1 (VP1)=8596. The node having the further data segment can be identified using the key and the further data segment retrieved.

In an expansion of the preceding development the receiver can with the first and/or second predictable parameter VP1, VP2 be supplied additionally with an indication of a processing speed VG of data segments per unit of time, with its being possible with the aid of the processing speed VG to produce the key, valid at an instant P, for retrieving the data segment GR valid at said instant P. If, for example, the receiver is informed that the current image number, meaning the first predictable parameter VP1, is 1512 and that the processing speed VG is 15 images per second, meaning that 15 data segments are processed per second, then the receiver will at a later instant, for example 30 seconds later, be able to calculate the current image number from VP1+VG·30 seconds=1512+15·30=1962.

That means that after 30 seconds the current image number will be 1962 and hence that the new key can be ascertained on the basis of the new current image number.

Request messages AN, AN' of different receivers KE, KE' are, in an expansion, dispatched for retrieving the same data segment G1 based on a specifiable or random time delay ZV. The result is that the request messages AN, AN' will be sent off at different times and that after the request message AN has first been received the intermediate node will buffer the requested data segment G1 for subsequent request messages.

Thus, for example, each of the receivers KE, KE' has an individual, pre-specified time delay ZV that has to be activated before the request message is sent, for example

|  | ZV |
|---|---|
| KE | 0.5 seconds |
| KE' | 0.75 seconds |

The time delay ZV can alternatively be ascertained randomly. The respective time delay is therein generated in each receiver by a random generator before the respective request message is sent.

The transmitter S for providing a data stream D includes the following units:
a) First unit M1 for dividing the data stream D into at least one data segment G1;
b) Second unit M2 for producing a key S1 to the data segment G1, with the key S1 being unambiguously assignable to the data segment G1;
c) Third unit M3 for selecting a node K1 for the data segment G1 from a set of nodes K1, K2 in a network NET on the basis of the key S1, S2 assigned to the data segment G1, G2;
d) Fourth unit M4 for conveying the data segment G1 to the node K1 selected for the data segment G1.

The transmitter S can furthermore have a fifth unit M5 embodied for implementing at least one of the developments of the methods.

The receiver KE for retrieving at least one data segment G1 of a data stream D, with at least one data segment G1 of the data stream D being provided at a node K12 in a network NET, characterized in that there are the following units:
a) Sixth unit M6 for providing a key S1 to a data segment G1, with the key S1 being unambiguously assignable to the data segment G1;
b) Seventh unit M7 for selecting a node K1 for the data segment G1 from a set of nodes K1, K2 in the network NET on the basis of the key S1 assigned to the data segment G1;
c) Eighth unit M8 for sending a request message AN to the selected node K1 for conveying the data segment G1 associated with the key S1;
d) Ninth unit M9 for receipt of the data segment G1 by the receiver KE.

The receiver E can furthermore have a tenth unit M10 embodied for implementing at least one of the developments of the methods.

The units M1, . . . , M10 can each be implemented and embodied by hardware, or with the aid of a processor in software form, or in part hardware, part software form. The units are, for example, integrated in a computer connected to the internet or in a mobile device connected via the UMTS network (UMTS—Universal Mobile Telecommunications System), for instance a mobile telephone.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for providing a data stream, comprising:
dividing the data stream into at least one data segment;
producing a key for each data segment, with the key being unambiguously assigned to the data segment;
selecting a node for each data segment from a set of nodes in a network, the node being selected for each of the data segments based on the key assigned to the respective data segment; and
conveying each data segment to the node selected for the data segment.

2. A method for retrieval of a data segment of a data stream by a receiver, with the data segment being made available by a node in a network having a set of nodes, the method comprising:
providing a key for the data segment, with the key being unambiguously assigned to the data segment;

selecting the node for the data segment from the set of nodes in the network, the node being selected for each of the data segments based on the key assigned to the respective data segment;

sending a request message to the selected node for conveying the data segment associated with the key; and receiving the data segment at the receiver.

3. The method as claimed in claim 2, wherein
the request message is augmented by at least one identifier, that identifies an unambiguous assignment of the request message to the requested data segment.

4. The method as claimed in claim 2, wherein
the receiver is supplied with synchronizing information,
a further key is determined from the synchronizing information, and
the further key is used to retrieve a further data segment of the data stream.

5. The method as claimed in claim 4, wherein
the synchronizing information contains an explicit indication of the further key or a first predictable parameter associated with the further data segment.

6. The method as claimed in claim 2 wherein
the data segment is conveyed on a transmission path from the node to the receiver, and
while being conveyed, the data segment is stored for a specifiable period of time by an intermediate node on the transmission path.

7. The method as claimed in claim 4 wherein
the request message is evaluated by the intermediate node and, if the data segment associated with the key is present, the data segment is sent by the intermediate node to the receiver.

8. The method as claimed in claim 4 wherein
different receivers send additional request messages for retrieving the same data segment, and
the same data segment is sent to the different receivers with a time delay.

9. The method as claimed in claim 1 wherein
the key is produced using a systematic key, and
the systematic key is generated based on a predictable parameter of the data segment.

10. The method as claimed in claim 1 wherein
the key is produced using a non-systematic key, and
the non-systematic key is generated based on content of the data segment.

11. The method as claimed in claim 5, wherein
a number is used to characterize the data segment, and
the first predictable parameter is determined based on the number characterizing the data segment.

12. The method as claimed in claim 11, wherein
the first predictable parameter additionally includes an indication of a processing speed of data segments per unit of time,
each data segment is valid at an instant of time, and
the key that is valid at the instant for retrieving the data segment valid at the instant is produced based on the processing speed valid at the instant.

13. The method as claimed in claim 1, wherein
a parameter characterizes the node, and
the node is selected based on the key such that an identity between the parameter characterizing the node and the key is maximized or a specifiable threshold is attained.

14. The method as claimed in claim 1, wherein two or more data segments are processed.

15. A transmitter for providing a data stream, comprising:
a unit to divide the data stream into at least one data segment;
a second unit to produce a key for the data segment, with the key being unambiguously assigned to the data segment;
a third unit to select a node for the data segment, the node being selected from a set of nodes in a network for each of the data segments based on the key assigned to the respective data segment; and
a fourth unit to convey the data segment to the node selected for the data segment.

16. The transmitter as claimed in claim 15 wherein
the second unit produces the key using a systematic key, and
the systematic key is generated based on a predictable parameter of the data segment.

17. A receiver for retrieving at least one data segment of a data stream, the data segment of the data stream being provided at a node in a network having a set of nodes, the receiver comprising:
a sixth unit to produce a key for the data segment, with the key being unambiguously assigned to the data segment;
a seventh unit to select the node from which the data segment the data segment will be retrieved, the node being selected for each of the data segments based on the key assigned to the respective data segment;
an eighth unit to send a request message to the node selected, the request message requesting the data segment associated with the key; and
a ninth unit to receive the data segment.

18. The receiver as claimed in claim 17 wherein
the receiver is supplied with synchronizing information,
a further key is determined from the synchronizing information, and
the further key is used to retrieve a further data segment of the data stream.

19. The method as claimed in claim 1 wherein
the key is produced using a non-systematic key, and
the non-systematic key is generated based on an image content of the data segment.

* * * * *

UNITED STATES PATENT AND TRADEMARK OFFICE
CERTIFICATE OF CORRECTION

| | | |
|---|---|---|
| PATENT NO. | : 9,137,031 B2 | Page 1 of 1 |
| APPLICATION NO. | : 12/448416 | |
| DATED | : September 15, 2015 | |
| INVENTOR(S) | : Oertel | |

It is certified that error appears in the above-identified patent and that said Letters Patent is hereby corrected as shown below:

In the claims

Claim 7, Column 9, Line 28

Delete "claim 4" and insert --claim 6--, therefor.

Claim 8, Column 9, Line 33

Delete "claim 4" and insert --claim 6--, therefor.

Signed and Sealed this
Twenty-ninth Day of December, 2015

Michelle K. Lee
*Director of the United States Patent and Trademark Office*